(12) United States Patent
McKinley et al.

(10) Patent No.: US 8,504,183 B2
(45) Date of Patent: Aug. 6, 2013

(54) WEB BROWSER BASED REMOTE CONTROL FOR PROGRAMMABLE MULTIMEDIA CONTROLLER

(75) Inventors: David McKinley, Dartmouth, MA (US); Gerald W. Shields, Littleton, MA (US); Kevin C. Kicklighter, Centerville, MA (US)

(73) Assignee: Savant Systems, LLC, Hyannis, MA (US)

( * ) Notice: Subject to any disclaimer, the term of this patent is extended or adjusted under 35 U.S.C. 154(b) by 477 days.

(21) Appl. No.: 12/600,194

(22) PCT Filed: Sep. 4, 2008

(86) PCT No.: PCT/US2008/010376
§ 371 (c)(1),
(2), (4) Date: Nov. 13, 2009

(87) PCT Pub. No.: WO2009/032280
PCT Pub. Date: Mar. 12, 2009

(65) Prior Publication Data
US 2010/0241254 A1 Sep. 23, 2010

Related U.S. Application Data
(60) Provisional application No. 60/970,165, filed on Sep. 5, 2007.

(51) Int. Cl.
*G06F 3/48* (2006.01)
*G06F 15/177* (2006.01)
*G06F 17/00* (2006.01)

(52) U.S. Cl.
USPC .............................. 700/94; 715/737; 709/220

(58) Field of Classification Search
USPC .............. 700/19, 94, 275; 725/38, 78, 80–82, 725/85; 341/50; 715/744, 746, 736, 737
See application file for complete search history.

(56) References Cited

U.S. PATENT DOCUMENTS 7,234,115 B1 * 6/2007 Sprauve et al. ................ 715/746
7,911,626 B2 * 3/2011 Ferlitsch ....................... 358/1.13
(Continued)

FOREIGN PATENT DOCUMENTS

| EP | 1 355 451 A2 | 10/2003 |
| WO | WO-01/08152 A1 | 2/2001 |
| WO | WO-2006/055484 A1 | 5/2006 |

OTHER PUBLICATIONS

"Notification of Transmittal of the International Search Report and the Written Opinion of the International Searching Authority, or the Declaration," International Filing Date: Sep. 4, 2008, International Application No. PCT/US2008/010376, Applicant: Savant Systems LLC, Inc., Date of Mailing: Apr. 14, 2009, pp. 1-12.

*Primary Examiner* — Dave Robertson
(74) *Attorney, Agent, or Firm* — Cesari and McKenna, LLP

(57) ABSTRACT

A web browser-equipped device, such as a personal digital assistant, tablet, notebook or other computer, wireless telephone handset or other device, to function as a remote control unit for a programmable multimedia controller. Web pages served by the multimedia controller to the web browser-equipped device present a user interface which may include programmable background motifs, colors and indicators. The user interface also typically includes one or more user-operable buttons whose functionalities are programmable. A method is provided for automatically converting a user interface device configuration for the multimedia controller into web pages suitable for a browser-equipped device.

21 Claims, 2 Drawing Sheets

U.S. PATENT DOCUMENTS

| | | | |
|---|---|---|---|
| 7,920,101 B2* | 4/2011 | Lum et al. | 345/2.1 |
| 8,001,219 B2* | 8/2011 | Moorer et al. | 709/220 |
| 8,005,236 B2* | 8/2011 | Igoe | 381/81 |
| 8,271,881 B2* | 9/2012 | Moorer et al. | 715/737 |
| 2001/0035860 A1* | 11/2001 | Segal et al. | 345/173 |
| 2003/0011640 A1* | 1/2003 | Green et al. | 345/810 |
| 2003/0122866 A1 | 7/2003 | Yook | |
| 2008/0120676 A1* | 5/2008 | Morad et al. | 725/127 |
| 2008/0168382 A1* | 7/2008 | Louch et al. | 715/781 |
| 2008/0276182 A1* | 11/2008 | Leow | 715/740 |
| 2011/0041074 A1* | 2/2011 | Bells et al. | 715/744 |

* cited by examiner

WEB BROWSER BASED REMOTE CONTROL FOR PROGRAMMABLE MULTIMEDIA CONTROLLER

RELATED APPLICATIONS

This application is a US national phase application of international application PCT no. PCT/US2008/10376, filed by David McKinley et al. on Sep. 4, 2008 and entitled WEB-BROWSER BASED REMOTE CONTROL FOR PROGRAMMABLE MULTIMEDIA CONTROLLER, which claims priority from the U.S. provisional application Ser. No. 60/970,165, filed by David McKinley et al. on Sep. 5, 2007, entitled WEB-BROWSER BASED REMOTE CONTROL FOR PROGRAMMABLE MULTIMEDIA CONTROLLER.

BACKGROUND OF THE INVENTION

1. Field of the Invention

The present invention relates generally to the fields of multimedia and communications and, more specifically, to a programmable multimedia controller for home, commercial, professional audio or video, broadcast or film studio, security, automation or other use which is capable of interfacing with, controlling and managing a wide variety of audio, video, telecommunications, data communications and other devices.

2. Background Information

With the ever increasing complexity of electronic devices, simple yet effective device control is becoming increasingly important. While once electronic devices could adequately be controlled with only a handful of analog knobs and switches, modern electronic devices often present users with a vast array of configurable options and parameters, which require complex controls to manipulate and select. In response to users' demands for "convenience," these controls are often implemented on handheld remote control units, which use infrared (IR), radiofrequency (RF), or other types of signals to interface with the electronic devices being controlled. Yet actual convenience is seldom achieved with conventional remote control units.

Users are typically burdened with having to manipulate a number of separate, device-specific remote control units, each of which typically implements a different control scheme. Thus, to perform even basic functions, a user must have all the required remote control units on hand, and be familiar with how to manipulate each one. Further, the user must understand how their devices are interconnected, so that they may select appropriate inputs for passing signals between the devices. For example, if a user desires to watch a DVD movie with the lights dimmed and a telephone ringer suppressed, he may have to operate three audio/video (A/V) remote control units, one for a DVD player, one for a television, and one for an A/V receiver, as well as a remote control unit for a device controller, such as an X10™ lighting controller, in addition to manipulating a handset of a cordless telephone (in a sense, yet another remote control unit). Each of these remote control units generally operates differently, and the user must transition among several control schemes to perform the desired functions. Further, the user must select the proper inputs for each device, for example so that the video signals from the DVD player will make their way through the A/V receiver for display on the television.

Many of the control schemes commonly employed with remote control units are non-intuitive and difficult to use. Most remote control units are designed with a button-centric paradigm, such that numerous function-specific buttons are crowded into a relatively small space on the face of the remote control unit. The crowded button layout of button-centric remote control units often makes it difficult to select a desired button from the many buttons available, especially in low-light conditions. If a user inadvertently presses the "wrong" button, a device may perform an unwanted action or enter an undesired mode or state. This may confuse or aggravate the user. Further, sometimes a user may be uncertain which button to press in order to activate a desired function. In such a situation, the user may have to decipher abbreviated, often cryptic, legends printed on, or about, the buttons of the remote control unit. As these legends are often only a few characters long, a user may have to refer to a manual to determine what the legends mean, and what functions are associated with each button. In short, many button-centric remote control units are far from intuitive and easy-to-use.

Furthermore, while a variety of so-called "universal" remote control units exist that claim to improve upon the shortcomings of device-specific remote control units, conventional "universal" remote controls generally fall far short of their claims. Typical "universal" remote control units simply map the functionality of the buttons of device-specific remote control units to buttons of the "universal" remote control. The underlying control schemes are generally not altered. So, while the control schemes of the device specific remote control units are all implemented on a single remote control unit, they are not unified or simplified in any way. Further, since conventional "universal" remote control units attempt to control a range of devices, they typically have even more buttons with cryptic legends than device-specific remote controls. Thus, the problems of a button-centric paradigm are aggravated. Also, most "universal" remote control units tend to be far from universal, as they typically do not operate with devices other than audio and video devices. For example, conventional "universal" remote controls do not generally include functionality for controlling telephony devices, data devices, security devices, motor-operated devices, relay-operated devices, Internet access/browser devices, general-purpose computers, handicap assistance devices, and/or other types of devices.

In addition, a variety of high-end touch-panel controllers exist that purport to improve upon device-specific remote control units. For example, Crestron Electronics, Inc. of Rockleigh, N.J. offers a line of high-end touch-panel controllers that are widely available. These touch-panel controllers incorporate central processor units, graphics controllers, I/O interfaces and other complex components similar to those found in portable computers, rendering them complicated and costly to manufacture. Further, such touch-screen controllers generally require extensive custom programming to adapt to particular installations. Thus, their complexity and cost renders them unsuitable for many applications.

SUMMARY OF THE INVENTION

In brief summary, the present invention enables a web browser-equipped device, such as a personal digital assistant, tablet, notebook or other computer, wireless telephone handset or other device, to function as a remote control unit for a programmable multimedia controller. Web pages served by the multimedia controller to the web browser-equipped device present a user interface which may include programmable background motifs, colors and indicators. The user interface also typically includes one or more user-operable buttons whose functionalities are programmable.

In another aspect of the present invention, a method is provided for automatically converting a user interface device configuration for the multimedia controller into web pages suitable for a browser-equipped device. The web pages produced by the conversion process substantially preserve overall appearance, user-operable buttons or other controls, indicators and other graphic elements that would normally be displayed to a user on a touchscreen.

An advantage of the present invention is that even though a given user may choose among a wide variety of remote control devices to use with the multimedia controller, or may choose to use different remote control devices at different times, the user will be presented with a user interface and experience which is substantially uniform and thus familiar and comfortable. For example, a user may choose to use a wall mounted or tabletop touchscreen to control the multimedia controller while the user is at home. Typically, the touchscreen displays screens with buttons or other control elements which are organized and stylized to provide a particular experience that may be customized based on user-specified preferences. When the user is away from home and does not have access to the touchscreen, the user may wish to control the multimedia controller using a wireless telephone handset. The present invention enables the user to do so using a browser-equipped handset which will display screens that are organized and stylized very closely to those of the touchscreen with which the user is familiar.

Another advantage of the present invention is that web-based remote control systems may be implemented without writing source code or low level programming. By first creating a system configuration for a programmable multimedia controller using a graphical programming environment and then converting the configuration to web pages, a web-based remote control arrangement may be quickly and easily implemented.

Yet another advantage of the present invention is that users are enabled to choose from a rich variety of browser-equipped devices to use as remote controls for a programmable multimedia controller. Thus, a user who is already familiar with and prefers using a particular wireless handset, PDA or computer may advantageously use that preferred device as a remote control, thus avoiding the inconvenience of using a different, unfamiliar device.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
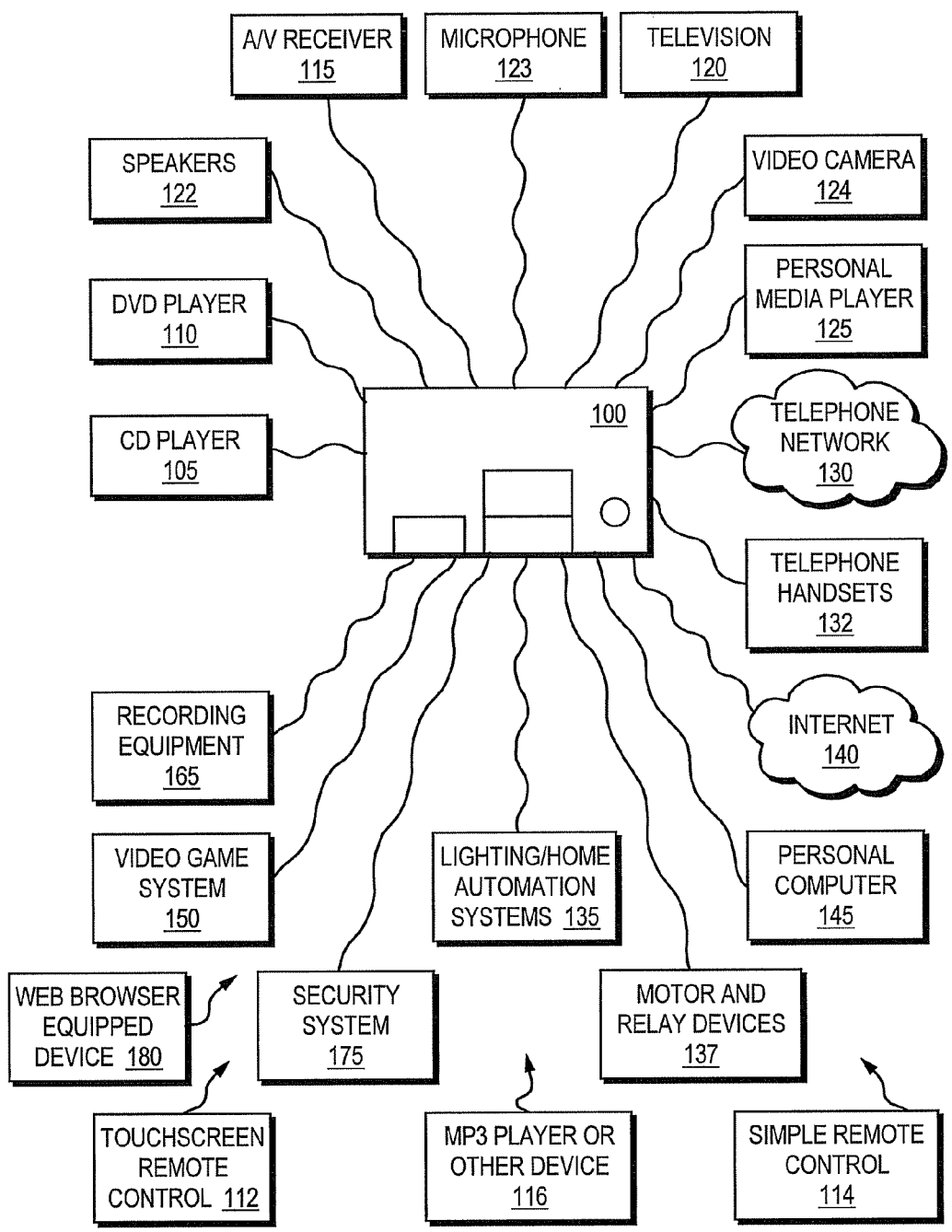
FIG. 1 is a block diagram of a programmable multimedia controller which is capable of interconnecting with and controlling a variety of devices, according to an illustrative embodiment of the present invention.

FIG. 1 is a block diagram of a programmable multimedia controller 100, interconnected to a number of devices, to form a programmable multimedia system 101, in accordance with an illustrative embodiment of the present invention. The term "programmable multimedia controller" should be interpreted broadly as a device capable of controlling, switching data among, or interoperating with a variety of electronic devices, such as audio, video, telephony, data, security, motor-driven, relay-driven, or other types of electronic devices. By interacting with these devices the programmable multimedia controller may implement an integrated multimedia control solution.

In an illustrative embodiment, programmable multimedia controller 100 may be connected to a wide range of audio/video components, for example, a compact disk (CD) player 105, a digital versatile disc (DVD) player 110, an audio/video receiver 115, a television 120, a personal media player 125, speakers 122, a microphone 123, and a video camera 124. Programmable multimedia controller 100 may also be connected to telephony devices such as a telephone network 130 and telephone handsets 132. Telephone network 130 may be a publicly switched telephone network (PSTN), an Integrated Services Digital Network (ISDN) or other public or private telecommunications network.

In addition, programmable multimedia controller 100 may intercommunicate with variety of light or home automation systems 135. Systems 135 may operate using the X10 protocol developed by Pico Electronics, the INSTEON™ protocol developed by SmartHome, Inc., the CEBus standard managed by the CEBus Industry Council, or another well known home automation or control protocol. Similarly programmable multimedia controller 100 may be connected to motor or relay operated devices 137 that may include, for example, a heating, ventilation and air conditioning system (HVAC) system, an irrigation system, an automatic shade or blind system, an electronic door lock, or other types of devices.

A computer network, such as the Internet 140, may also be connected to multimedia controller 100. In addition, a personal computer (PC) 145, video game systems 150, home recording equipment 165 or other devices may also be connected to multimedia controller 100.

A wide variety of devices may be used as remote controls which interface with and control the operation of multimedia controller 100 and, in turn, the operations of components or systems that may be interconnected with controller 100. Such remote controls may include a touchscreen remote control 112, a simple remote control 114, which may be electromechanical, an MP3 player or other device 116, and a web browser-equipped device 180.

Web browser-equipped device 180 includes a wireless telephone handset such as an Apple® iPhone®, an Internet tablet, a notebook, laptop or other computer, or essentially any other device which is browser-enabled and has appropriate connectivity, wireless or wired, to communicate with programmable multimedia controller 100. In a preferred embodiment, Apple® Bonjour® service discovery protocol may used by programmable multimedia controller 100 to advertise its support for web browser-equipped devices and enable such devices to find a web application of the type described below.

Such remote controls may interface with multimedia controller 100 via a wired connection, an IR link, an RF link, a Bluetooth™ link, a ZigBee™ link or another appropriate communication interface.

Details regarding the hardware, software, capabilities and programmability of programmable multimedia controller 100 may be found in the co-pending related applications referenced above. Briefly, the expandable system includes a programmable multimedia controller (PMC), which is based on a general purpose computer and is capable of providing a wide variety of programmable services. The PMC is responsive to a system configuration. The system configuration associates a unique identifier with each device as illustrated in FIG. 1 that is eligible to become part of the system. Each device has a unique identifier (ID) that was previously assigned to each device. In the present environment, that unique ID may be the manufacturer's serial number on the web browser equipped device that the user desires to employ to access the multimedia system.

To do so, the device advertises its availability to join the multimedia control system on the LAN using a program such as Apple Bonjour® or other similar program in order to communicate with the PMC. The PMC, based upon the unique identifier that the device advertises, determines whether the device is eligible to operate in the system.

Further, as described in detail in co-pending applications entitled "Programmable Multimedia Controller With Programmable Services" and "Programming Environment and Metadata Management for Programmable Multimedia Controller," configuration of programmable multimedia controller 100 may advantageously be done in a graphical programming environment. As a result the configuration process described in those co-pending applications, a set of files representing a particular system configuration is preferably created or assembled. In a preferred embodiment, those files may include Extensible Markup Language (XML) files which represent component profiles, user profiles, zone configurations, a connection configuration and a service implementation among others.

Also included among the files which are preferably created or assembled during the basic configuration process are files which specify the overall appearance, button locations, button functionalities and any other desired attributes for each screen of a touchscreen remote control 112. Collectively, such files shall be referred to hereinafter as a "user interface device (UID) configuration." Files are also created or assembled during the basic configuration process which specify button functionalities and on screen displays for simple remote controls 114. In addition, other files which may be created or assembled are graphics files which may contain artwork, images or other elements which may be displayed as part of a user interface. Collectively, all files or other data necessary to specify a complete system configuration, including user interface device configurations, shall be referred hereinafter as a "configuration bundle."

Figure 2:
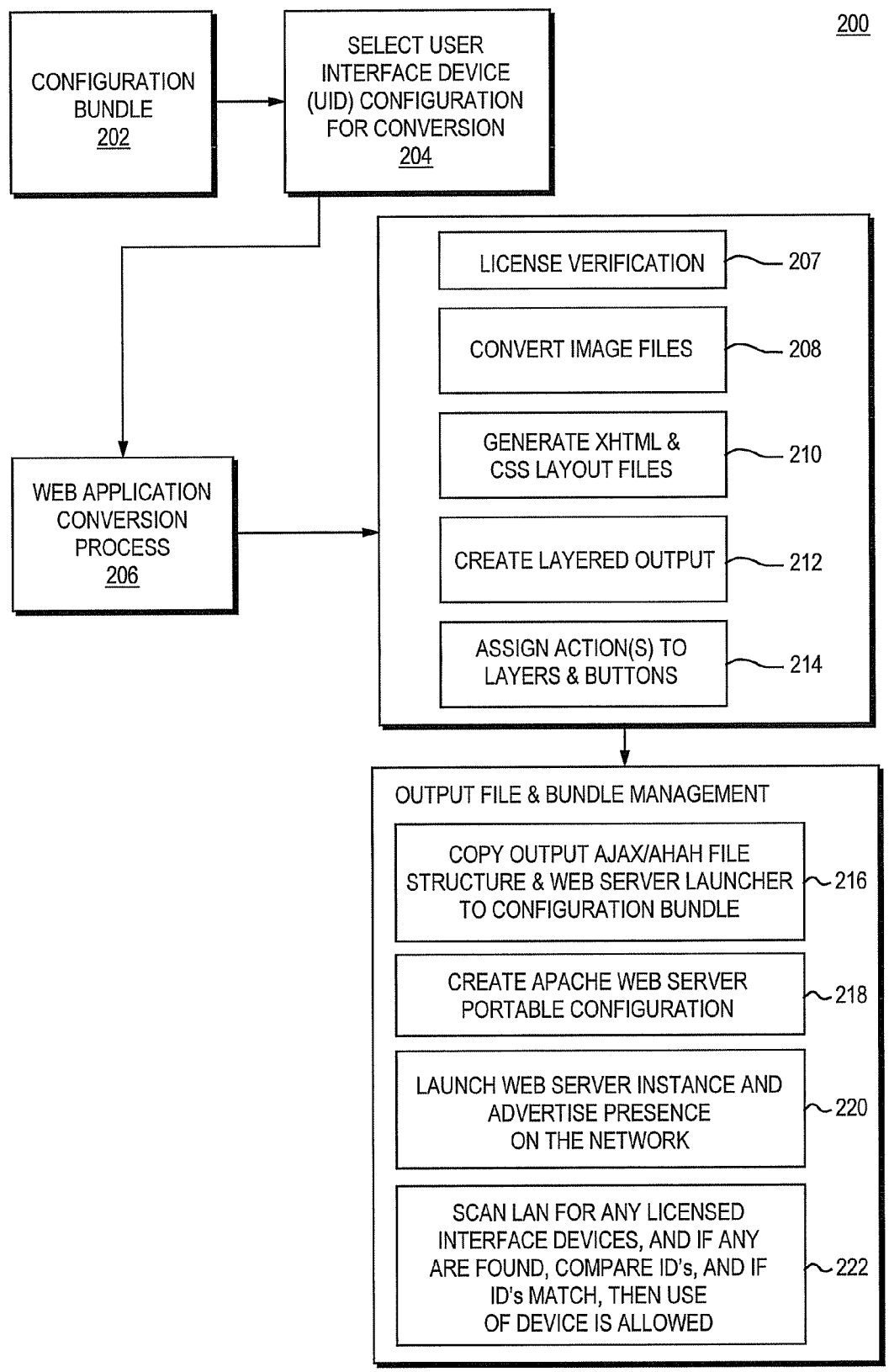
FIG. 2 is a schematic block diagram illustrating a method for converting a user interface device configuration for a programmable multimedia controller into web pages which may be served to a web browser-equipped device.

FIG. 2 shows a method 200 of converting a user interface device configuration into a web application suitable to enable a web browser-equipped device to function as a remote control for programmable multimedia controller 100. In a preferred embodiment, configuration bundle 202 is essentially a directory structure which, as described previously, includes one or more UID configurations. At step 204, a UID configuration contained within configuration bundle 202 is selected for conversion.

A web application conversion process begins at step 206. The first step in the process is a license verification step 207. If the license is confirmed for the specified device, then the process continues to step 208. At step 208, any image files which are part of the selected UID configuration are preferably converted to portable network graphics (PNG) files and compressed. The PNG file format is well suited for transmitting images over the Internet.

Next, at step 210, each "screen" of the selected UID configuration is inserted into an extended hypertext markup language (XHTML) layer with a unique identifier. In addition, cascading style sheet (CSS) layout files are created. Essentially, XHTML describes the content of layered web pages created at step 212, whereas CSS describe the colors, fonts and layout of those web pages.

At step 214, based on functionality defined in the UID configuration selected for conversion, actions are assigned to layers and user-operable buttons which appear in various web pages. If an action specified in the UID configuration is incompatible with use of a browser-equipped device, the "button" or "screen" (or both) related to the action is rendered unavailable or invisible.

At step 216, all of the output web pages created as a result of steps 208-214, along with a web server launcher are copied into configuration bundle 202. At step 218, a portable Apache web server configuration template file is created. When the portable web server is subsequently activated on a programmable multimedia controller 100, the server will configure itself for the target environment. After step 218, the process continues to step 220 which is to launch the web server portable configuration and the device also advertises its presence on the network. In the meantime, on the programmable multimedia controller in the system, its software program instructions include an instruction to scan the Local Area Network with which it is associated to discover any available devices. Such devices are licensed to operate in the system, as noted earlier and thus are licensed interfaces to the system. In addition, as noted herein, the unique ID of each device is compared to a list of ID's of devices that are eligible to operate in the system. If the device that is discovered on the LAN by the PMC has a matching ID, then it is then allowed to operate in the system and can thus access the user interfaces via its web browser as in step 222.

The invention thus provides the web browser equipped device with the same user interface graphics, screens and buttons over the Internet to thereby allow a Web browser-equipped device that may include a wireless telephone handset such as an Apple® iPhone®, an Internet tablet, a notebook, laptop or other computer, or essentially any other device which is browser-enabled and has appropriate connectivity, wireless or wired, to communicate with programmable multimedia controller 100. This allows user to employ such a web browser equipped device to interface with the programmable multimedia system to thus remotely control various home automation systems using the same graphics and user interfaces with which the user is already familiar.

The foregoing description has been directed to particular embodiments of this disclosure. It will be apparent, however, that other variations and modifications may be made to the described embodiments, with the attainment of some or all of their advantages. Additionally, the procedures or processes described above may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A system comprising:
a programmable multimedia controller capable of controlling a plurality of devices including audio, video, telephony, data, lighting or security devices, said programmable multimedia controller in communication with a separate touch screen remote control that displays screens of user interface features, said user interface features usable to remotely control said programmable multimedia controller and said plurality of devices, said programmable multimedia controller configured to
store a configuration bundle including a user interface device configuration that specifies said user interface features of said screens of said separate touch screen remote control,
convert said user interface device configuration into web pages that substantially preserve said user interface features of said screens as they would be displayed to a user on said separate touch screen remote control, transmit said web pages that substantially preserve said user interface features of said screens; and a separate web browser-equipped device, coupled in communicating relationship with said programmable multimedia controller, said separate web browser-equipped device configured to access and display one or more of said web pages that substantially preserve said user interface features of said screens, wherein said web browser-equipped device uses said web pages that substantially preserve said user interface features of said screens to function as an additional remote control for said programmable multimedia controller.

2. The system including a programmable multimedia controller as defined in claim 1 wherein said user interface features include at least one of overall appearance, button locations, or button functionalities.

3. The system including a programmable multimedia controller as defined in claim 1 wherein said user interface device configuration further includes information specifying button functionalities.

4. The system including a programmable multimedia controller as defined in claim 1 wherein said user interface device configuration includes graphic files having at least one of artwork or images.

5. The system including a programmable multimedia controller as defined in claim 1 wherein said user interface device configuration includes image files.

6. The system including a programmable multimedia controller as defined in claim 5 wherein said image files contained in said user interface device configuration are converted to produce said web pages that substantially preserve said user interface features of said screens.

7. The system including a programmable multimedia controller as defined in claim 5 wherein said image files contained in said user interface device configuration are converted to portable network graphics files and are compressed.

8. The system including a programmable multimedia controller as defined in claim 7 wherein said compressed portable network graphics files are transmitted over the Internet to said separate web browser-equipped device.

9. The system including a programmable multimedia controller as defined in claim 7 wherein said user interface features of screens of said touch screen remote control are inserted into an extended hypertext markup language layer with a unique identifier.

10. The system including a programmable multimedia controller as defined in claim 1 further comprising cascading sheets to describe colors, fonts and layouts of web pages.

11. A method comprising:

coupling a programmable multimedia controller capable of controlling a plurality of devices including audio, video, telephony, data, lighting or security devices to a separate touch screen remote control that displays screens of user interface features, said user interface features usable to remotely control said programmable multimedia controller;

configuring said programmable multimedia controller with a configuration bundle including user interface device configurations that specify said user interface features of said screens of said separate touch screen remote control;

converting said user interface device configurations into web pages that substantially preserve the user interface features of the screens as they would be displayed to a user on said separate touch screen remote control;

coupling in communicating relationship with said programmable multimedia controller, a separate web browser-equipped device;

transmitting one or more of said web pages that substantially preserve said user interface features of said screens to said separate web browser-equipped device; and accessing and displaying said one or more of said web pages that substantially preserve said user interface features of said screens at said separate web browser equipped device, wherein said separate web browser-equipped device uses said one or more web pages that substantially preserve said user interface features of said screens to function as a remote control for said programmable multimedia controller.

12. The method as defined in claim 11, comprising:

copying said web pages that substantially preserve said user interface features of said screens into said configuration bundle;

copying a web server launcher into said configuration bundle; and creating a portable web server configuration template file.

13. The method as defined in claim 12, further comprising:

activating a portable web server on said programmable multimedia controller, said web server configuring itself for a target environment.

14. The method as defined in claim 11, further comprising:

said separate web browser-equipped device finding a web application that is a communication interface with which to communicate with said programmable multimedia controller.

15. The method as defined in claim 14, further comprising:

said separate web browser-equipped device advertising its presence.

16. The method as defined in claim 15, further comprising:

said programmable multimedia controller using a discovery protocol to search for separate web browser-equipped devices.

17. The method as defined in claim 16, further comprising:

when a device is found by said programmable multimedia controller, comparing at said multimedia controller, an advertised device unique identifier with a list of unique identifiers of devices that are eligible to operate in said system, and allowing an advertising device to interface with said system if a match of unique identifiers is found.

18. The method as defined in claim 11, wherein said user interface features include at least one of graphic files, artwork, or images.

19. The method as defined in claim 11, further comprising:

rendering invisible or unavailable, buttons and screens that are incompatible with the use of the separate web browser-equipped device.

20. The method as defined in claim 11, further comprising:

performing a license verification process to verify that devices are licensed to operate in the system.

21. The method as defined in claim 11, further comprising:

said separate web browser-equipped device including one or more of a wireless telephone handset, an Internet tablet, a notebook, or a laptop.

* * * * *